(12) United States Patent
Fujii

(10) Patent No.: US 6,867,810 B1
(45) Date of Patent: Mar. 15, 2005

(54) LENS DEVICE FOR A CAMERA WITH A STEPPING MOTOR DRIVE OPTIMIZED FOR SPEED AND POWER SAVING

(75) Inventor: Naoki Fujii, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/390,264

(22) Filed: Sep. 3, 1999

(30) Foreign Application Priority Data

Sep. 4, 1998 (JP) .......................................... 10-251430

(51) Int. Cl.⁷ ............................................. H04N 5/225
(52) U.S. Cl. .................................... 348/361; 348/240.3
(58) Field of Search ............................. 348/361, 240.3, 348/360, 240.99, 335, 207.99, 340; 396/75, 73, 85, 86, 87; 359/381

(56) References Cited

U.S. PATENT DOCUMENTS

| | | | |
|---|---|---|---|
| 4,593,999 A | * 6/1986 | Adachi et al. | ................. 355/55 |
| 4,783,676 A | * 11/1988 | Aihara et al. | ................ 396/135 |
| 4,962,399 A | * 10/1990 | Numako et al. | ............... 396/76 |
| 5,239,331 A | * 8/1993 | Kobe et al. | .................. 396/135 |
| 5,570,149 A | * 10/1996 | Wakabayashi et al. | ......... 396/85 |
| 5,756,981 A | * 5/1998 | Roustaei et al. | ........ 235/462.42 |
| 6,051,949 A | * 4/2000 | Oono et al. | .................. 396/135 |
| 6,163,341 A | * 12/2000 | Kawaguchi et al. | ...... 348/240.3 |
| 6,285,154 B1 | * 9/2001 | Yasuda et al. | ................. 396/86 |

FOREIGN PATENT DOCUMENTS

| | | |
|---|---|---|
| JP | 5-188267 | 7/1993 |
| JP | 6-347683 | 12/1994 |
| JP | 7-218807 | 8/1995 |
| JP | 9-230215 | 9/1997 |
| JP | 2702474 | 10/1997 |

* cited by examiner

*Primary Examiner*—Wendy R. Garber
*Assistant Examiner*—Jason Whipkey
(74) *Attorney, Agent, or Firm*—Ostrolenk, Faber, Gerb & Soffen, LLP

(57) ABSTRACT

A lens unit consists of a plurality of lens frames, a stepping motor, and a driving control unit. The plurality of lens frames for holding an imaging optical system lies in a lens barrel and moves over a stowage interval and a zoom interval. The stowage interval is an interval between a position of stowage at which the lens frames are stowed and a ready-to-image position at which imaging is enabled. The zoom interval is an interval over which the ready-to-image position exists and a power varying action is executed. The stepping motor moves the plurality of lens frames. During execution of a thrusting action or storing action, the driving control unit drives and controls the stepping motor in a first driving mode. The thrusting action is executed for moving the plurality of lens frames from the position of stowage to the ready-to-image position. The stowing action is executed for moving the lens frames from any position within the zoom interval to the position of stowage. During execution of a zooming action for moving the lens frames over the zoom interval, the driving control unit drives and controls the stepping motor in a second driving mode in which a lower current is used than in the first driving mode.

2 Claims, 10 Drawing Sheets

PRIOR ART
FIG.10

|  | 1 | 2 | 3 | 4 |
|---|---|---|---|---|
| A PHASE | S | O | N | O |
| Ā PHASE | N | O | S | O |
| B PHASE | O | S | O | N |
| B̄ PHASE | O | N | O | S |

PRIOR ART
FIG.11

|  | 1 | 2 | 3 | 4 |
|---|---|---|---|---|
| A PHASE | N | S | S | N |
| Ā PHASE | S | N | N | S |
| B PHASE | N | N | S | S |
| B̄ PHASE | S | S | N | N |

PRIOR ART
FIG.12

|  | 1 | 2 | 3 | 4 | 5 | 6 | 7 | 8 |
|---|---|---|---|---|---|---|---|---|
| A PHASE | N | N | O | S | S | S | O | N |
| Ā PHASE | S | S | O | N | N | N | O | S |
| B PHASE | O | N | N | N | O | S | S | S |
| B̄ PHASE | O | S | S | S | O | N | N | N |

LENS DEVICE FOR A CAMERA WITH A STEPPING MOTOR DRIVE OPTIMIZED FOR SPEED AND POWER SAVING

BACKGROUND OF THE INVENTION

1. Field of the Invention

The present invention relates to a lens unit and an electronic camera using it. More particularly, this invention is concerned with a lens unit for driving a collapsible zoom lens using a stepping motor, and an electronic camera having the lens unit. In particular, this invention is concerned with driving and controlling of a lens barrel of the electronic camera.

2. Description of the Related Art

In recent years, cameras for achieving photography using photographic film or electronic cameras (hereinafter these types of cameras are generically called cameras) are demanded to have a compact camera body for convenience in portable use. The electronic cameras produce an electrical image signal using an imaging device or the like, and record the image signal on a recording medium or the like.

Moreover, the cameras are requested to offer more advanced functions, or specifically, to include a high-precision automatic focusing (AF) unit, and a high-power zoom lens that is used as an imaging lens.

The conventional cameras have been devised from various aspects in an effort to realize both a compact camera body and advanced functions at the same time. For example, cameras having a collapsible zoom lens unit or the like have become prevalent. Specifically, when such a camera is unused, an imaging lens barrel accommodating a plurality of lens frames that hold an imaging lens (or a zoom lens barrel when the imaging lens is a zoom lens) is stowed in a camera body. The camera thus becomes compact enough to be portable. When the camera is used, the lens barrel is thrust in front of the camera body. The plurality of lens frames in the lens barrel are moved to predetermined positions, whereby a power variation action (zooming action) or an automatic focusing (AF) action is executed.

In the collapsible zoom lens unit or the like, the lens frames are moved over two movable intervals, that is, a stowage interval and a zoom interval. Herein, the stowage interval is a movable interval between a position of stowage at which the lens frames are stowed in the camera body and a ready-to-image position at which the lens frames are thrust from the front surface of the camera body and imaging is enabled. The zoom interval is a movable interval over which the lens frames move with the ready-to-image position as a start point during execution of an imaging action, that is, an interval over which a predetermined lens frame is moved for achieving a zooming action.

The movable intervals moved by the lens frames are, as mentioned above, intervals moved thereby for achieving two different actions. Namely, the movable intervals include the zoom interval (or zooming area) moved for achieving a zooming action and the stowage interval moved for stowing the lens frames in the camera body. In this case, requirements to be met for driving the lens frames are different between the intervals.

Normally, movements made over the zoom interval by the lens frames are movements intended mainly for achieving an imaging action. Higher precision is therefore requested for the zoom interval. By contrast, high precision is not requested for the stowage interval, but a quicker action is requested. The lens frames (lens barrel) must be moved to their stowage positions by making fast and reliable movements. It is therefore desired to drive and control the lens frames under the conditions for driving that are optimal for each movable interval.

From this viewpoint, a lens drive unit disclosed in, for example, Japanese Patent No. 2702474 is designed to change a driving speed, at which a zoom lens is driven, between the zoom interval and any other interval. Namely, over the zoom interval, the driving speed at which the zoom lens is driven is controlled so that the zoom lens is driven at a low speed. Over a non-zoom interval, the driving speed at which the zoom lens is driven is controlled so that the zoom lens will be driven at a high speed.

According to the lens drive unit, the zoom lens is moved at a high speed over the non zoom interval. This makes it feasible to shorten the time required for changing the state of the unit from a movable state to a stowed state.

As mentioned above, according to the means disclosed in the Japanese Patent No. 2702474, it is noted that the driving speed at which the zoom lens is requested to be driven is different between the zoom interval and the other movable interval. Control is therefore given so that the conditions for driving the zoom lens will be changed between the zoom interval and the other movable interval.

However, a normal collapsible zoom lens unit is requested to meet the conditions for driving described below in addition to the driving speed at which the zoom lens is driven.

Normally, a means realized with a devised mechanism including a cam or the like for moving lens frames is used to move the lens frames at a relatively high speed over a stowage interval over which the lens frames are moved to be stored. Moreover, an unexpected extraneous force may be applied to a lens barrel holding the lens frames. For driving and controlling the lens barrel over the stowage interval over which the lens barrel is moved to be stowed, a sufficient torque is needed for driving.

Moreover, it is indispensable to move the lens barrel in finer steps over a zoom interval. This is intended to adjust the power of the zoom lens highly precisely. For reliably positioning a predetermined lens frame at a predetermined position, driving must be controlled highly precisely.

Furthermore, for example, in an electronic camera or the like, an electric circuit or the like relevant to an imaging system that consumes a relatively large amount of power for execution of an imaging action must be operated. Power to be consumed by any system of electric circuits other than the imaging system must therefore be minimized during execution of the imaging action.

A zooming action requires a relatively large amount of power and is frequently utilized during execution of the imaging action. Once a driving current needed for achieving the zooming action can be minimized, great power saving is realized. Minimization of the driving current needed for achieving the zooming action during execution of the imaging action is what has especially been demanded in recent years.

By the way, an unexpected extraneous force may be unintentionally applied to the lens barrel holding the lens frames, for example, as shown in the illustrative drawing of FIG. 9, an extraneous force F may act on a front lens frame 102 during imaging. This causes the lens frame 102 to move inward a camera body 101. The front lens frame 102 may be displaced from a predefined position at which it should be placed.

Conventionally, the lens frame or the driving cam is provided with an encoder for detecting a position. A lens barrel driving method employing a so-called closed loop realized by combining the encoder and a driving DC motor is adopted in order to solve the trouble of the foregoing displacement caused by the extraneous force P. According to this method, even when the position of a lens frame is changed due to the extraneous force or the like, the change in position can be detected by the encoder and can therefore be corrected.

Examples of lens barrels coping with an abnormal movement of a lens frame are disclosed in, for example, Japanese Unexamined Patent Publication Nos. 6-347683, 7-218807, and 9-230215. These technical means utilize an output of an encoder for detecting the position of a lens frame so as to detect an abnormal movement.

As for a method of driving lens frames, as already known, a driving method utilizing a stepping motor, which is controlled with driving pulses, as a driving source is advantageous over the method using the DC motor and encoder in combination in terms of costs and an occupied space. For example, Japanese Unexamined Patent Publication No. 5-188267 discloses a means using a stepping motor as a source for driving lens frames and a photosensor as a detecting means for detecting a reference position (home position).

The conditions for driving including a driving speed at which lens frames or the like are driven have a close relation to the driving source such as a motor. For controlling the driving source in strict conformity with the conditions for driving, the driving source must be limited to some type. Normally, as the driving source for driving lens frames in a camera or the like, a stepping motor obviating the necessity of an encoder and other members has been widely adopted in the past.

Now, general methods of driving a stepping motor will be described briefly. Normal methods of driving a stepping motor include a single-phase excitation driving method shown in FIG. 10, a two-phase excitation driving method shown in FIG. 11, a single/two-phase excitation driving method shown in FIG. 12, a micro-step driving (not shown) method, and other various driving methods.

The single-phase excitation driving method is a driving form of alternately conducting electricity to phase-A and phase-B coils as shown in FIG. 10. The coils can be driven with low power consumption, while a driving torque is relatively low.

Moreover, according to the two-phase excitation method, a rotor moves so that the magnetic poles thereof will be opposed to each other between two adjoining magnetic poles of a stator. A magnitude of rotation, by which the stepping motor rotates, caused by one change of the magnetic poles of the stator is identical to that according to the single-phase excitation method. The two-phase excitation method is a driving form for conducting electricity to the phase-A and phase-B coils simultaneously as shown in FIG. 11. In the two-phase excitation method, the stator must be excited all the time in order to keep the stepping motor stopped. The two-phase excitation method is characterized in that much more power consumption is needed compared with the single-phase excitation method but the stepping motor can be driven with a higher driving torque than that according to the single-phase excitation method. Consequently, the two-phase excitation method realizes faster movements.

According to the single/two-phase excitation method, single-phase excitation and two-phase excitation are repeated. For example, assume that the rotor starts rotating at a position at which it is opposed to one magnetic pole of the stator. With the next change of the magnetic poles of the stator, the rotor moves to be interposed between the two adjoining magnetic poles of the stator. With a subsequent change of the magnetic poles, the rotor moves to a position at which it is opposed to the other adjoining magnetic pole of the stator. A magnitude of rotation derived from one change of the magnetic poles of the stator is equivalent to a half of the magnitude of rotation provided according to the single-phase or two-phase excitation method. The magnitude of rotation derived from one change of the magnetic poles can be made smaller than that provided according to the single-phase or two-phase excitation method. The single/two-phase excitation method can achieve finer driving and ensure high positioning precision. Moreover, the single/two-phase excitation method has the merits of few vibrations and a low-pitch noise.

The micro-step driving method can electrically realize a microscopic step angle. The micro-step driving method is characterized in that it can ensure higher positioning precision than the single-/two-phase excitation method and contribute to realization of few vibrations and a low-pitch noise.

When the stepping motor is utilized, the driving method for driving the stepping motor should be changed according to the required conditions for driving. Thus, lens frames can be moved more efficiently. This is very convenient.

As far as a zoom lens barrel of an inner focus type is concerned, the positional relationship between zoom lenses and focus lenses is the greatest issue that must be settled to prevent displacement of a front lens frame caused by an extraneous force. According to a focusing method widely adopted for conventional silver film cameras, the positions of the focus lenses are determined based on the positions of the zoom lenses and measured distance information. It is impermissible that the front lens frame is displaced from its predefined position. According to the conventional means, it is indispensable to use the encoder to detect the position of a lens frame so that the lens frame can be controlled to lie at its predefined position all the time.

Moreover, conventional electronic cameras or video movies generally adopt a so-called contrast focusing method. According to the contrast focusing method, a high-frequency component of a signal acquired by an imaging device is detected in order to attain an in-focus state. At this time, distance information is unused. When this focusing means is employed, the positional relationship between the zoom lenses and focus lenses is not requested to be strictly accurate.

However, when a conventional electronic camera or the like adopts the contrast focusing method, as long as a displacement of the front lens frame caused by an extraneous force is limited, there is no obstacle to an imaging action. The necessity of the encoder is therefore obviated. However, when the stepping motor is used as a driving source for moving lens frames, the magnitude of displacement of the front lens frame that is of a certain level or more cannot be corrected unless the lens frames are returned to their reference positions (home positions). When a photographer uses a camera to execute an imaging action, the front lens frame out of all the lens frames included in the camera may be displaced to a larger extent. In this case, the photographer may continue imaging without being aware of the fact that the front lens frame is displaced. This results in certain problems as described below.

The distance between the zoom lenses and focus lenses becomes different from the predefined one. The focus lenses that are moved during execution of a focusing action may collide with the adjoining zoom lenses or the like.

Moreover, after the focusing action is completed, the distance to an object may be calculated based on the relationship between the positions of the zoom lenses and those of the focus lenses. Information concerning the distance to an object may be utilized as camera control information used to control a strobe unit or the like. In this case, if the displacement is very large, an error in camera control information becomes very large. This may lead to impairment of image quality.

Because of these troubles, as long as a zoom lens barrel having a front lens frame capable of advancing or withdrawing freely is adapted to a conventional electronic camera or the like, it is difficult to design a barrel driving structure, which uses a stepping motor as a driving source, without an encoder.

The present invention has been devised in an effort to overcome the above problems.

SUMMARY OF THE INVENTION

The first object of the present invention is to provide a lens unit capable of realizing efficient driving and controlling according to required conditions for driving, and contributing to reduction in power consumption of the whole unit. Specifically, when a storing action is executed for moving lens frames inward a camera body, driving and controlling is performed so that the lens frames can be moved more quickly. When a zooming action is executed as part of an imaging action, driving and controlling is performed so that the lens frames can be moved highly precisely.

The second object of the present invention is to provide an electronic camera having a lens unit that can contribute to reduction in power consumption, and thus providing excellent user-friendliness and excellent maneuverability. Specifically, driving and controlling a stepping motor used as a driving source for moving lens frames in an electronic camera or the like can be optimized according to a plurality of driving methods (driving modes).

The third object of the present invention is to provide a camera having a compact and low-cost zoom lens barrel. Specifically, even when a lens frame located on the side of an object is displaced due to an extraneous force applied to the lens frame, the displacement is resolved by automatically correcting it. An imaging action can therefore be executed continuously.

The fourth object of the present invention is to provide an electronic camera capable of producing and recording motion picture data and still picture data. Specifically, a zooming action to be executed as part of a motion picture imaging action and a zooming action to be executed as part of a still picture imaging action can be driven and controlled in different driving modes. Consequently, recording of noise components, including a noise sound caused by a motor or the like during driving for zooming while executing motion picture imaging can be prevented. Moreover, vibrations can be suppressed. Thus, high-quality motion picture data can be recorded. Besides, still picture data can be recorded properly.

Briefly, according to the first aspect of the present invention, a lens unit consists of a plurality of lens frames, a stepping motor, and a driving control means. The plurality of lens frames for holding an imaging optical system lies in a lens barrel and moves over a storage interval and a zoom interval. The storage interval is an interval between a position of stowage at which the lens frames are stowed and a ready-to-image position at which imaging is enabled. The zoom interval is an interval over which the ready-to-image position exists and a power varying action is executed. The stepping motor moves the plurality of lens frames. During execution of a thrusting action or a stowing action, the driving control means drives and controls the stepping motor in a first driving mode. The thrusting action is executed for moving the plurality of lens frames from the position of stowage to the ready-to-image position. The stowing action is executed for moving the lens frames from any position within the zoom interval to the position of stowage. Moreover, during execution of a zooming action for moving the lens frames within the zoom interval, the driving control means drives and controls the stepping motor in a second driving mode in which a lower current is used than in the first driving mode.

Moreover, according to the second aspect of the present invention, an electronic camera includes an electronic imaging means, an image processing means, and a recording means. The electronic imaging means photoelectrically converts an object image formed by an imaging optical system and thus produces an image signal. The image processing means performs predetermined processing on the image signal produced by the electronic imaging means and converts the image signal into a predetermined form. The recording means records an output of the image processing means as image data. The electronic camera further includes a plurality of lens frames, a stepping motor, a conveying means, and a driving control means. The plurality of lens frames for holding an imaging optical system lies in a lens barrel and moves over a stowage interval and zoom interval. The stowage interval is an interval between a position of stowage at which the lens frames are stowed and a ready-to-image position at which imaging is enabled. The zoom interval is an interval over which the ready-to-image position exists and a power variation action is executed. The stepping motor moves the plurality of lens frames. The conveying means conveys a driving force produced by the stepping motor to the lens frames. During execution of a thrusting action or stowing action, the driving control means drives and controls the stepping motor in a first driving mode. The thrusting action is executed for moving the plurality of lens frames from the position of stowage to the ready-to-image position. The stowing action is executed for moving the lens frames from any position within the zoom interval to the position of stowage. During execution of a zooming action for moving the lens frames within the zoom interval, the driving control means drives and controls the stepping mode in a second driving mode in which a lower current is used than in the first driving mode.

According to the third aspect of the present invention, an electronic camera includes an electronic imaging means, an image processing means, and a recording means. The electronic imaging means photoelectrically converts an object image formed by an imaging optical system and thus produces an image signal. The image processing means performs predetermined processing on the image signal produced by the electronic imaging means and converts the image signal to a predetermined form. The recording means records an output of the image processing means as image data. The electronic camera further includes a plurality of lens frames, a stepping motor, a conveying means, a control means, and a plurality of position detecting means. The plurality of lens frames for holding the imaging optical system lies in a lens barrel. At least one lens frame is driven to advance or withdraw beyond the front surface of a camera body. The stepping motor is driven with pulses in order to move the plurality of lens frames. The conveying means conveys a driving force produced by the stepping motor to the lens frames. The control means drives and controls the stepping motor and controls the positions of the lens frames. The plurality of position detecting means detects the positions of zooming of the lens frames.

According to the fourth aspect of the present invention, an electronic camera includes an electronic imaging means, an image processing means, and a recording means. The electronic imaging means photoelectrically converts an object image formed by an imaging optical system and thus produces an image signal. The image processing means performs predetermined processing on the image signal produced by the electronic imaging means and converts the image signal to a predetermined form. The recording means records an output of the image processing means as image data. The electronic camera capable of producing and recording motion picture data and still picture data further includes a plurality of lens frames, a stepping motor, a conveying means, and a driving control means. The plurality of lens frames for holding the imaging optical system lies in a lens barrel and moves over a stowage interval and a zoom interval. The stowage interval is an interval between a position of stowage at which the lens frames are stowed and a ready-to-image position at which imaging is enabled. The zoom interval is an interval over which the ready-to-image position exists and a power variation action is executed. The stepping motor moves the plurality of lens frames. The conveying means conveys a driving force produced by the stepping motor to the lens frames. During execution of a thrusting action, a stowing action, or a still picture imaging action, the driving control means drives and controls the stepping motor in a first driving mode. The thrusting action is executed for moving the plurality of lens frames from the position of stowage to the ready-to-image position. The stowing action is executed for moving the lens frames from any position within the zoom interval to the position of stowage. During execution of a zooming action or a motion picture imaging action, the driving control means drives and controls the stepping motor in a second driving mode in which a lower current is used than in the first driving mode. The zooming action is executed for moving the lens frame over the zoom interval.

These and other objects of the present invention and advantages thereof will be apparent from the description below.

According to the present invention, when a stowing action (imaging termination) is executed for moving lens frames inward a camera body, driving and controlling is performed so that the lens frames can be moved more quickly. When a zooming action (zooming) is executed as part of an imaging action, driving and controlling is performed so that the lens frames can be moved highly precisely. Thus, driving and controlling is performed efficiently according to the conditions for driving. There is thus provided a lens unit contributing to reduction in power consumption of the whole unit.

According to the present invention, driving and controlling a stepping motor serving as a driving source for moving lens frames included in an electronic camera or the like is optimized according to a plurality of driving methods (driving modes). There is thus provided an electronic camera realizing reduction in power consumption and contributing to improvement in user-friendliness and maneuverability.

Furthermore, according to the present invention, there is provided an electronic camera capable of producing and recording motion picture data and still picture data. Driving and controlling is performed in different driving modes between a zooming action to be executed as part of a motion picture imaging action and a zooming action to be executed as part of a still picture imaging action. It is therefore so that noise components including a noise sound emitted by a motor or the like during driving for zoom is prevented from being recorded during the execution of the motion picture imaging action. Besides, vibrations can be suppressed. This results in an electronic camera capable of recording excellent motion picture data and properly executing an imaging and recording action for producing still picture data.

BRIEF DESCRIPTION OF THE DRAWINGS

FIG. 10 is an explanatory diagram concerning a single-phase excitation driving method adopted for a conventional typical stepping motor;

FIG. 11 is an explanatory diagram concerning a two-phase excitation driving method adopted for the conventional typical stepping motor; and FIG. 12 is an explanatory diagram concerning a single/two-phase excitation driving method adopted for the conventional typical stepping motor.

DETAILED DESCRIPTION OF THE PREFERRED EMBODIMENT

An embodiment of the present invention will be described below. Herein, an electronic camera (hereinafter called simply a camera) designed to electrically produce an image signal by utilizing an imaging device or the like is utilized for the following description.

Figure 1:
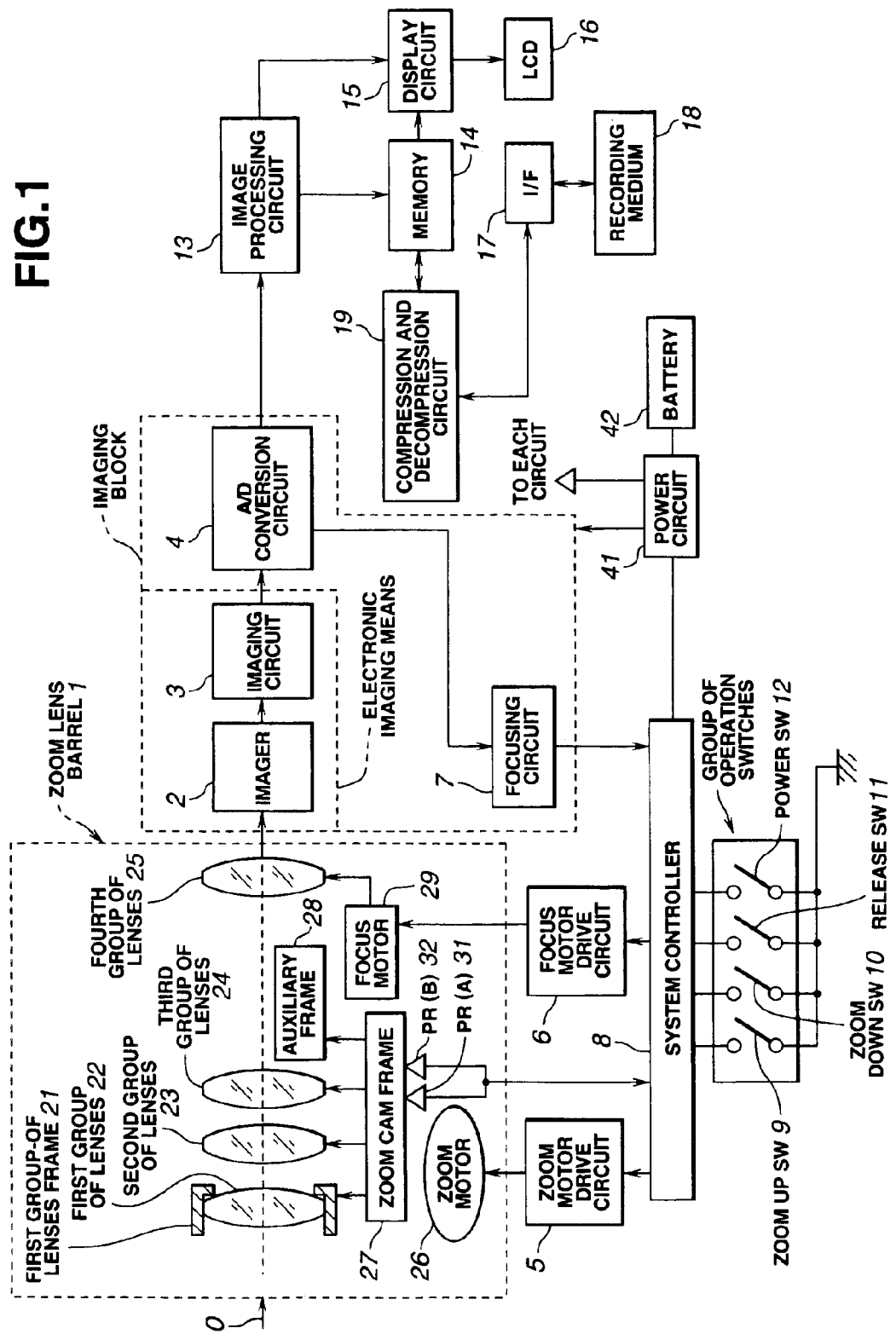
FIG. 1 is a block diagram showing the configuration of a camera in accordance with an embodiment of the present invention.

All actions of a camera in accordance with an embodiment of the present invention are, as shown in the block diagram of FIG. 1, controlled by a system controller 8 serving as a control means. A release switch (SW) 11, a zoom up switch 9, a zoom down switch 10, and a power switch 12 which are included in a group of operation switches serving as an operating means are electrically connected to the system controller 8. The release switch 11 is used to generate a signal instructing start of imaging. The zoom up switch 9 is used to generate a signal instructing execution of a zooming up action. The zoom down switch 10 is used to generate a signal instructing execution of a zoom down action. The power switch 12 is used to generate a signal instructing start or stop of power supply (a power on signal or a power off signal). These output signals of the operation switches are input to the system controller 8.

In this camera, first, the release switch 11 is used to instruct start of imaging. An object image acquired via an imaging optical system in a zoom lens barrel 1 is converted into an electric signal by an imager 2 that is an imaging device. An imaging circuit 3 performs image processing such as sampling and holding on the electric signal. The output image signal is converted into a digital signal by an A/D conversion circuit 4. A focusing circuit 7 samples contrast information, which is used to focus and drive an imaging lens, from a high-frequency component of a digital image signal output from the A/D conversion circuit 4. The contrast information is output to the system controller 8.

On the other hand, the image signal output from the A/D conversion circuit 4 is output to an image processing circuit 13 that is an image processing means. Various kinds of image processing is performed on the image signal, and then temporarily stored in the memory 14 such as a buffer memory. The image signal stored in the memory 14 is output to a display means such as liquid crystal display (hereinafter simply an LCD) via a display circuit 15 if necessary. An image is then displayed on the display means. Moreover, the image signal is output to a compression and decompression circuit 19. After being compressed in a manner suitable for recording, the image signal is output to a recording medium 18 that is a recording means, such as, a memory card or flash memory via an interface (I/F) 17. The image signal is recorded in it. The image signal recorded in a compressed form in the recording medium 18 is read into the compression and decompression circuit 19 via the I/F 17 in response to a predetermined instruction signal sent from the group of operation switches. The image signal is then decompressed in a manner suitable for display, and then read into the memory 14. The image signal is output to the LCD 16 for display via the display circuit 15.

In the present embodiment, a block composed of the imager 2, imaging circuit 3, and others is an electronic imaging means for photoelectrically converting an object image formed by the imaging lens held by a plurality of lens frames, and thus producing an image signal. A block including at least the electronic imaging means as well as the A/D conversion circuit 4, focusing circuit 7, and other components shall be referred to as an imaging block.

The system controller 8 drives a focus motor 29 incorporated in the zoom lens barrel 1 via a focus motor drive circuit 6. The system controller 8 thus executes a focusing action (AF action) for moving the zoom lens barrel 1.

During execution of an imaging action, the zoom up SW 9 or zoom down SW 10 may be manipulated prior to the manipulation of the release SW 11. In this case, the system controller 8 fills the role of a driving control circuit. Specifically, the system controller 8 drives a zoom motor 26 incorporated in the zoom lens barrel 1 via a zoom motor drive circuit 5 according to an input zooming action instruction, and thus executes a power varying action (zooming action) for moving the imaging optical system.

A battery 42 serving as a driving power supply is electrically connected to the system controller 8 via a power circuit 41. The power circuit 41 supplies power to the internal circuits of the camera under the control of the system controller 8.

The zoom lens barrel 1 consists of such members as the imaging optical system, a first group-of-lenses frame 21, a zoom cam frame 27, the zoom motor 26, the focus motor 29, an auxiliary frame 28, a photoreflector PR(A) 31, and a photoreflector PR(B) 32. The imaging optical system consists of a first group of lenses 22, a second group of lenses 23, a third group of lenses 24, and a fourth group of lenses 25. The first group-of-lenses frame 21 holds the first group of lenses 22. The zoom cam frame 27 enables the power varying action (zooming action). The zoom motor 26 drives the zoom cam frame 27. The focus motor 29 moves a predetermined group of lenses included in the system of imaging lenses along an optical axis O so as to enable a focusing action (AF action). The auxiliary frame 28 holds the focus motor 29 and others. The photoreflectors PR(A) 31 and PR(B) 32 serve as position detecting means.

Figure 2:
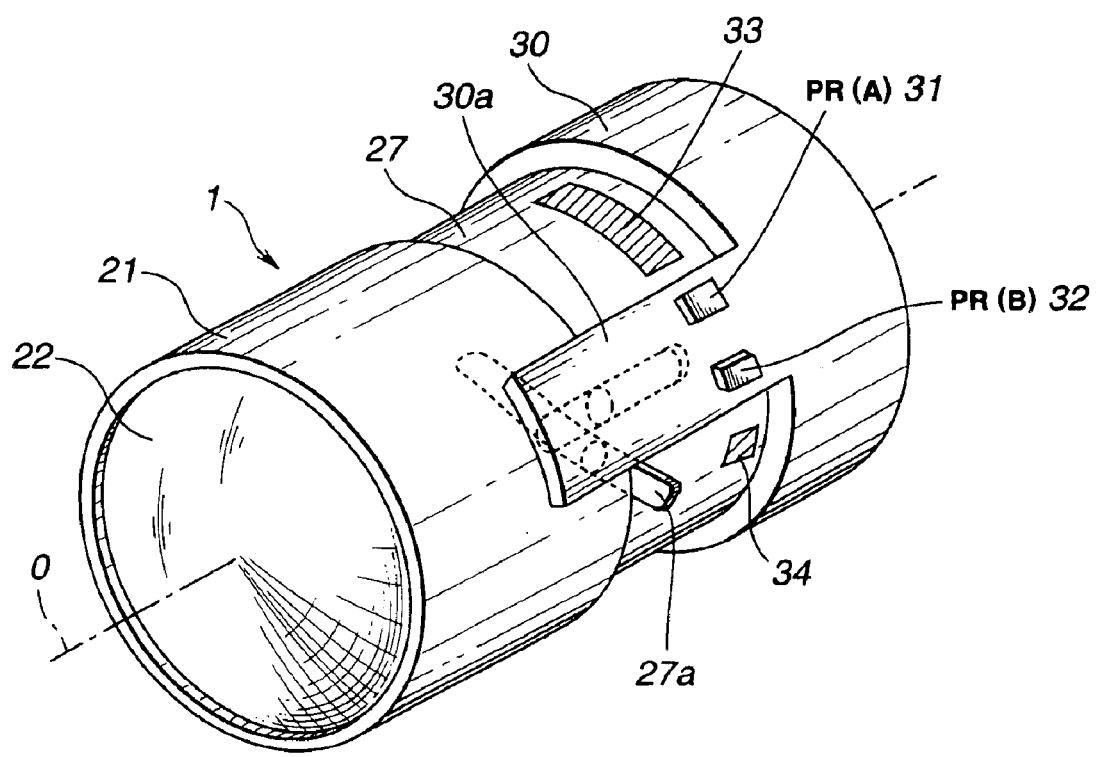
FIG. 2 is a perspective view showing a zoom lens barrel of the camera shown in FIG. 1.

The zoom lens barrel 1 will be described furthermore. FIG. 2 is a perspective view showing the zoom lens barrel of the camera of the present embodiment.

The zoom lens barrel 1 consists of a stationary frame 30, the imaging optical system, the zoom motor 26 (not shown in FIG. 2) (see FIG. 1), the zoom cam frame 27, the focus motor 29 (not shown in FIG. 2) (see FIG. 1), the auxiliary frame 28 (not shown in FIG. 2) (see FIG. 1), and the two photoreflectors PR(A) 31 and PR(B) 32. The stationary frame 30 locks and bears the zoom lens frame 1 on the front surface of the camera body (not shown). The imaging optical system consists of the plurality of groups of lenses (22, 23, 24, 25) (partly not shown in FIG. 2) (see FIG. 1). The zoom motor 26 is realized with a stepping motor and serving as a zoom driving source. The zoom cam frame 27 serves as a conveying means to be driven by the zoom motor 26, and is borne by the stationary frame 30 so that it can rotate freely. The zoom cam frame 27 also serves as a cam member for bearing the first group-of-lenses frame 21, second group of lenses 23, third group of lenses 24, and auxiliary frame 28 so that they can advance or withdraw in directions along the optical axis O. The focus motor 29 moves the fourth group of lenses 25 (see FIG. 1) in directions along the optical axis O and thus enables a focusing action. The focusing motor 29 is placed in the auxiliary frame 28 for performing driving for focusing which bears the fourth group of lenses 25 so that the fourth group of lenses 25 can advance or withdraw freely in the directions along the optical axis O. The two photoreflectors PR(A) 31 and PR(B) 32 serve as position detecting means for detecting the position of a cam pin to be engaged with a cam groove 27a in the zoom cam frame 27 by detecting the rotated state of the zoom cam frame 27.

The first group of lenses 22 is located on the extreme side of an object, and placed to project forward from the camera body during execution of an imaging action. The first group of lenses 22 is held by the first group-of-lenses frame 21. The second group of lenses 23, the third group of lenses 24, and the fourth group of lenses 25 that includes focus lenses are stowed in the zoom cam frame 27.

The PR(A) 31 and PR(B) 32 are juxtaposed in the same circumferential direction on the outer circumference of the stationary frame 30. A detection pattern (A) 33 and a detection pattern (B) 34 serving as reflection members are bonded side by side to predetermined positions on the outer circumference of the zoom cam frame 27 in a direction orthogonal to the optical axis O. The detection pattern (A) 33 is formed so that a detection period will be longer than a detection period required to detect the detection pattern 34. The detection pattern (A) 33 is made longer than the distance between the PR(A) 31 and PR(B) 32.

When the PR(A) 31 and PR(B) 32 receive light reflected from the detection pattern (A) 33 and detection pattern (B) 34, output signals of the PR(A) 31 and PR(B) 32 are detected. The position of the zoom cam frame 27, that is, to which position the zoom lens barrel 1 is moved over a collapse interval or zoom interval can thus be sensed (see FIG. 4A FIG. 4B, and FIG. 4C).

The zoom cam frame 27 is shaped substantially like a cylinder. The first group-of-lenses frame 21 is engaged with the outer circumference of the zoom cam frame 27 so that the first group-of-lenses frame 21 can slide freely. A cam groove 27a having a predetermined shape is bored at a predetermined position on the circumference of the zoom cam frame 27. A driving pin jutting towards the inner circumference of the first group-of-lenses frame 21 is engaged with the cam groove 27a. The first group-of-lenses frame 21 is rectilinearly guided in directions along the optical axis O owing to a rectilinear guide groove bored in the inner circumference of a projecting arm 30a of the stationary frame 30. When the zoom cam frame 27 is rotated using the zoom motor 26, the first group-of-lenses frame 21 is driven to advance or withdrawn in a direction along the optical axis O. The first group-of-lenses frame 21 thus moves from a rearmost position within the collapse interval (position of stowage or position of collapse) to a topmost position within the zoom interval (extreme telephoto position).

The second group of lenses 23, third group of lenses 24, and auxiliary frame 28 are held in the zoom cam frame 27 so that they can advance or withdraw freely along the optical axis. When the zoom cam frame 27 is rotated using the zoom motor 26, the members of the imaging system such as the second group of lenses 23, third group of lenses 24, and auxiliary frame 28 are moved in a direction along the optical axis O.

Moreover, when a zooming action is executed, the focus motor 29 is moved along with advancement or withdrawal of the auxiliary frame 28. At the same time, the focus motor 29 is driven to rotate along a predetermined tracking curve. This causes the fourth group of lenses 25 to move to an in-focus position that is a position of zooming.

Figure 3:
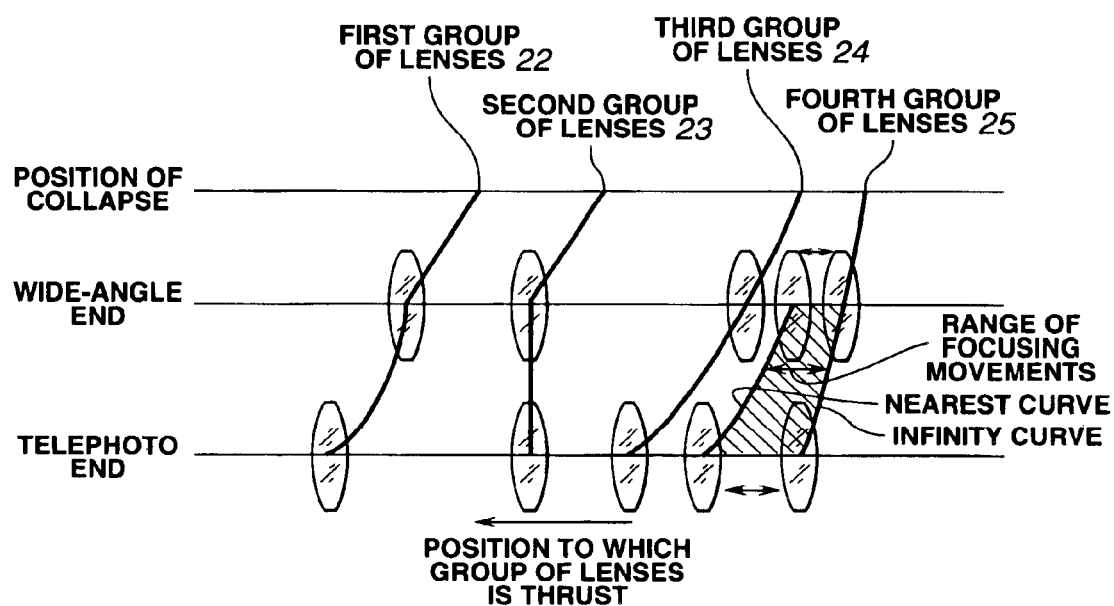
FIG. 3 is a conceptual diagram showing the relationships among positions of thrust to which groups of lenses are thrust by moving the zoom lens barrel of the camera shown in FIG. 1 from a position of collapse through a wide-angle end position (ready-to-image position) to a telephoto end position.

FIG. 3 is a conceptual diagram showing the positional relationship among positions of thrust to which the groups of lenses are thrust from their positions of collapse through their wide-angle end positions (ready-to-image positions) to their telephoto end positions within the zoom lens barrel of the camera.

In FIG. 3, the position of collapse is a position at which the zoom lens barrel 1 is fully stowed in the camera body. The position of collapse is equivalent to the rearmost position within the collapse interval. The wide-angle end (position) and telephoto end (position) are equivalent to both end positions within a movable range within the zoom lens barrel 1 is movable with the camera set to an imaging enabled state, that is, within the zoom interval. An extreme end position at which the variable power of the imaging lenses is set to a wide-angle value is referred to as a wide-angle end. An extreme end position at which the variable power thereof is set to a telephoto value is referred to as a telephoto end. The wide-angle end is equivalent to the ready-to-image position and to a foremost end position within the collapse interval.

As shown in FIG. 3, when the zoom lens barrel 1 moves from the position of collapse to the wide-angle end (ready-to-image position), the first to fourth groups of lenses 22 to 25 are thrust to predetermined positions. When the zoom lens barrel 1 stays at the wide-angle end, the camera enters the ready-to-image state.

Moreover, when the zoom lens barrel 1 is moved over the interval from the wide-angle end to the telephoto end, the first and third groups of lenses 22 and 24 are thrust. By moving the zoom lens barrel 1 in a direction along the optical axis, a power varying action (zooming action) is achieved. Accordingly, the fourth group of lenses 25 is thrust to move in the same direction within a predetermined range. The fourth group of lenses 25 is moved over a hatched range in FIG. 3, that is, a focusing movable range, whereby a focusing action (AF action) is achieved.

A position of thrust to which the fourth group of lenses 25 is thrust is determined with a distance to an object and a variable power. That is to say, as indicated with a "nearest" curve and an "infinity" curve in FIG. 3, the position of thrust, to which the fourth group of lenses 25 is thrust, associated with the same distance to an object varies depending on the variable power.

Moreover, as mentioned above, when the PR(A) 31 and PR(B) 32 are opposed to the detection pattern (A) 33 and detection pattern (B) 34 respectively, they receive light reflected from the detection pattern (A) 33 and detection pattern (B) 34. The PR(A) 31 and PR(B) 32 then generate on signals. Within which of the collapse interval and zoom interval the zoom cam frame 27 lies is sensed based on the output signals of the PR(A) 31 and PR(B) 32 and the angle of rotation of the zoom cam frame 27.

Figure 4:
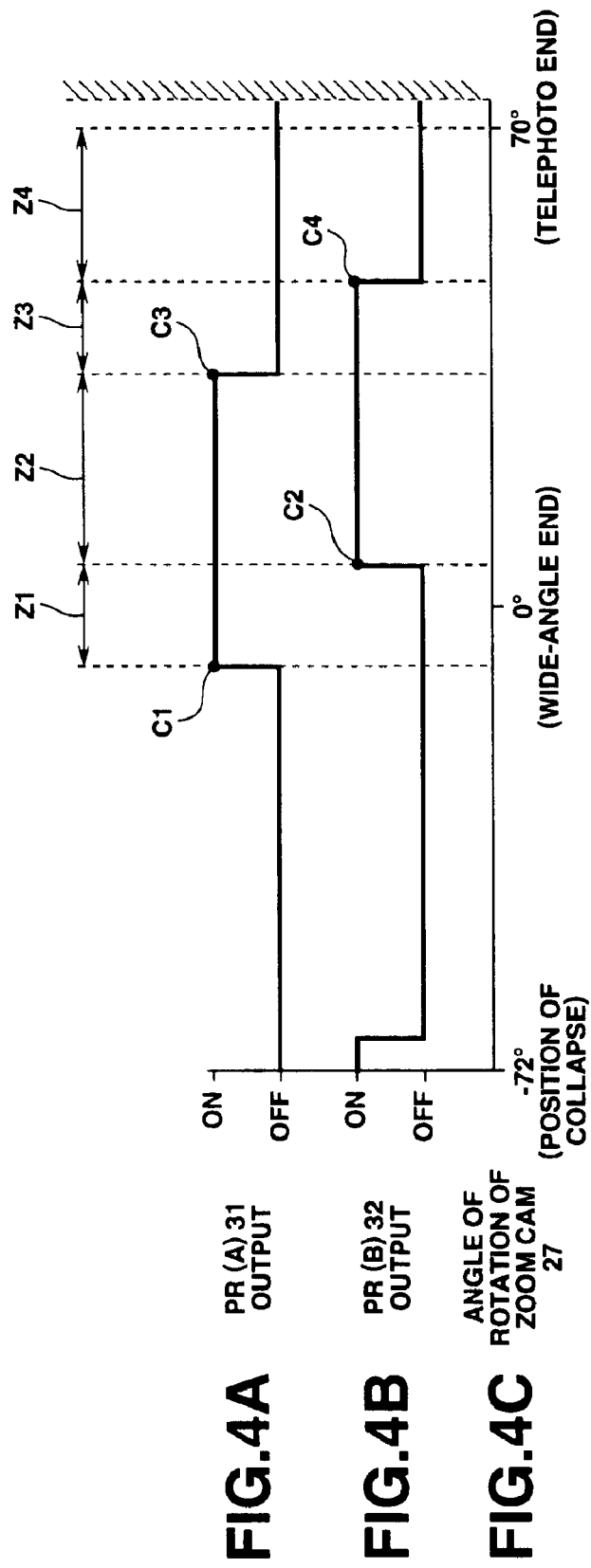
FIG. 4A, FIG. 4B, and FIG. 4C show output signals of a PR(A) 31 and a PR(B) 32, zones within a zoom interval which can be detected using the output signals, and angles of rotation by which a zoom cam frame 27 is rotated.

FIG. 4A, FIG. 4B, and FIG. 4C show the output signals of the PR(A) 31 and PR(B) 32 and zones within the zoom interval which can be detected based on the output signals.

According to the present embodiment, since the locations of the PR(A) 31 and PR(B) 32 and the detection pattern (A) 33 and detection pattern (B) 34 are devised as mentioned above, the four zones (zones Z1 to Z4 in FIG. 4A) within the zoom interval can be detected using the PR(A) 31 and R(B) 32.

The camera in accordance with the present embodiment has the foregoing components. For example, an extraneous force may act on the first group-of-lenses frame 21 that is one of the lens frames projecting from the camera body, and the first group-of-lenses frame 21 may be moved largely towards the camera body. Otherwise, an extraneous force may act on the first group-of-lenses frame 21 during driving for zooming, and the zoom motor 26 may malfunction terribly. In this case, the actually detected position of zooming of the zoom cam frame 27 will disagree with the data of the predefined position of zooming that is pre-stored in the system controller 8. For example, assume that the position of zooming must be instructed to be equivalent to the telephoto end according to a driving instruction sent from the system controller 8. If the zoom cam frame 27 actually lies near the wide-angle end, there may arise a difference between position data of the zoom cam frame 27 defined based on the instruction signal sent from the system controller 8 and the position of zooming of the zoom cam frame 27 detected by the PR(A) 31 and PR(B) 32.

In the camera of the present embodiment, the zoom motor 26 is driven and rotated in order to plunge the zoom cam frame 27 into a predetermined position near the wide-angle end. When the position of the zoom cam frame 27 detected by the PR(A) 31 and PR(B) 32 exists within the collapse interval, the zoom cam frame 27 is thrust to the predetermined position near the wide-angle end. At the same time, the data of the position of zooming pre-stored in the system controller 8 is rewritten into data representing the wide-angle end. Consequently, when the position of the zoom cam frame 27 becomes abnormal due to an extraneous force or the like, the position thereof is corrected.

Operations exerted by the thus configured camera of the embodiment during execution of an imaging action will be described below.

Figure 5:
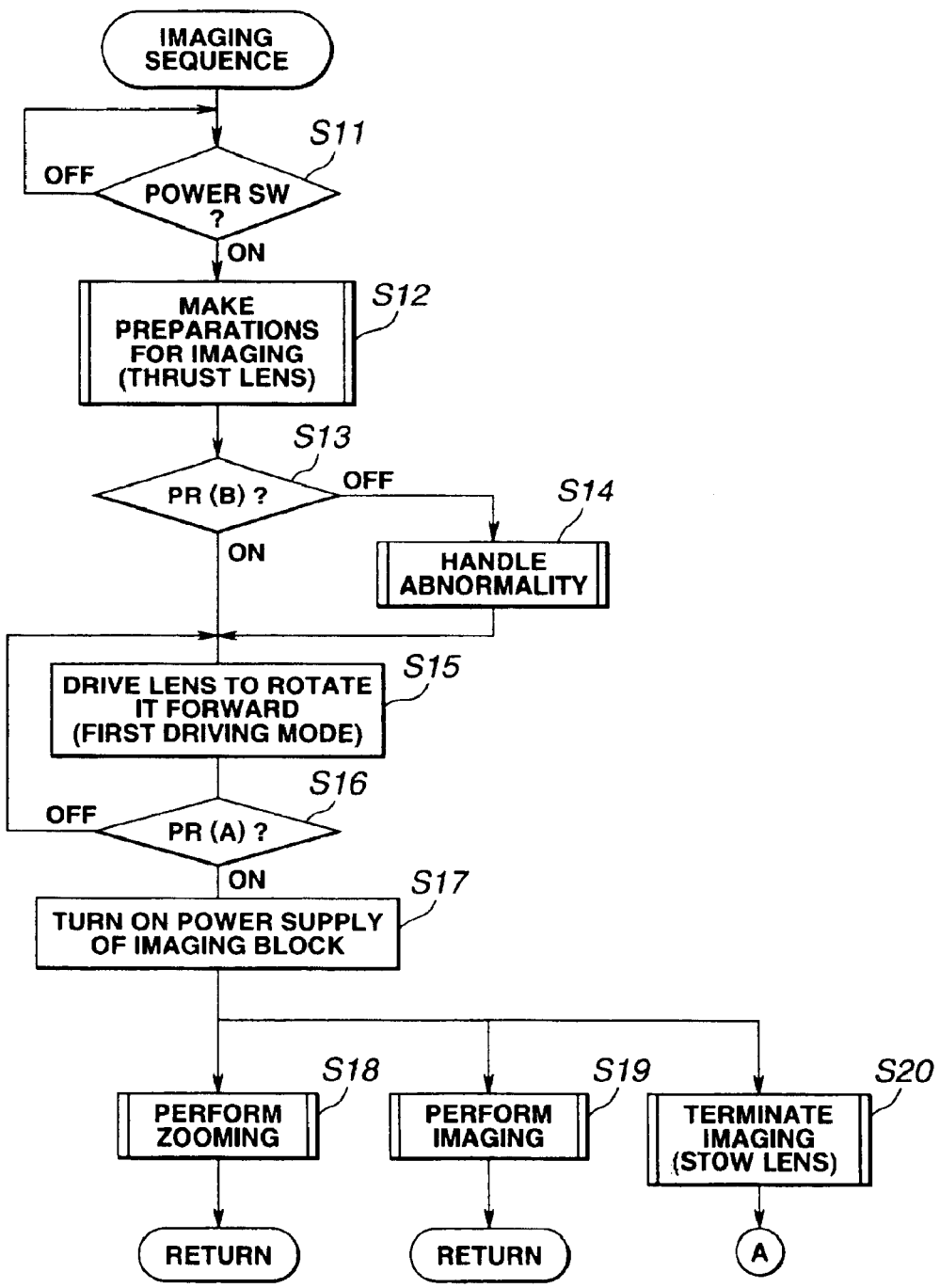
FIG. 5 is a flowchart describing a sequence of an imaging action executed in the camera shown in FIG. 1.

FIG. 5 is a flowchart describing a sequence of an imaging action executed in the camera of the present embodiment.

At step S11, the system controller 8 of the electronic camera checks the state of the power SW 12 out of the group of operation switches. When it is confirmed that the power SW 12 is turned on, control is passed to the next step S12.

At step S12, a subroutine of ready-to-image processing is carried out. That is, the zoom lens barrel 1 is thrust from the position of collapse to the ready-to-image position (wide-angle end position within the zoom interval). The processing for bringing the electronic camera to the ready-to-image state (lens thrusting) is carried out.

At step S13, the system controller 8 monitors the state of the output signal of the PR(B) 32. When an on signal sent from the PR(B) 32 is detected, control is passed to the next step S15. If the on signal sent from the PR(B) 32 is not detected at the step S13, a subroutine of abnormality handling (see FIG. 8) is carried out at step S14. Control is then passed to step S15.

At step S15, the system controller 8 drives the zoom motor 26 using the zoom motor drive circuit 5 so that the zoom motor 26 will be driven to rotate in a predetermined direction (herein, in a forward direction). This causes the zoom cam frame 27 to rotate. Consequently, the plurality of lens frames including the first group-of-lenses frame 21 is thrust in a direction along the optical axis O. The zoom lens barrel 1 is therefore thrust out. At this time, the zoom motor 26 is driven and controlled according to the two-phase excitation driving method associated with the first driving mode by the system controller 8. When the zoom lens barrel 1 moves to the ready-to-image position, the output signal of the PR(A) 31 is turned on.

Specifically, the system controller 8 monitors the state of the output signal of the PR(A) 31. The step S15 and subsequent processing are repeatedly carried out until the on signal sent from the PR(A) 31 is detected at step S16. When the on signal sent from the PR(A) 31 is detected at the step S16, control is passed to the next step S17. At the step S17, the system controller 8 controls the power circuit 41 and starts power supply to the imaging block (turns on the power supply of the imaging block).

Power supply to the imaging block is thus started, whereby a state enabling imaging actually, that is, the ready-to-image state is established. In this state, a photographer manipulates the group of operation switches to execute a desired action.

For example, the subroutine of zooming of step S18 is carried out by manipulating the zoom up SW 9 or zoom down SW 10. Consequently, a desired zooming action is executed (see FIG. 7).

During the zooming action, processing described below is carried out. Specifically, the system controller 8 serving as a driving control means drives and controls the zoom motor 26 via the zoom motor drive circuit 5. At this time, the zoom motor 26 is driven and controlled according to the single/two-phase excitation driving or micro-step driving method associated with the second driving mode in which a lower current is used than in the first driving mode. When an operation switch different from the zoom down SW 9 and zoom down SW 10 is manipulated, the subroutine of zooming is terminated and the camera is returned to an imaging standby state (main routine).

Figure 7:
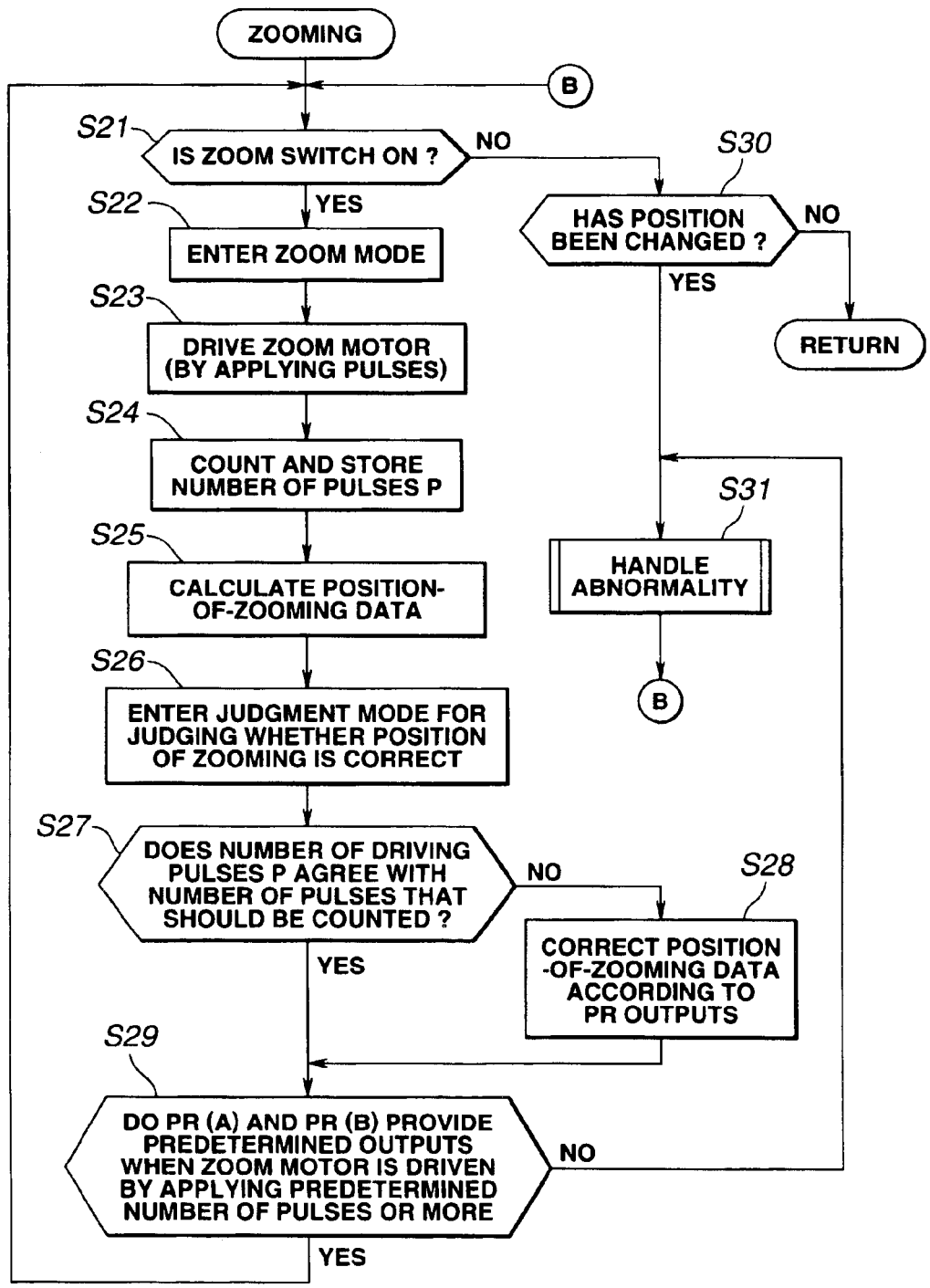
FIG. 7 is a flowchart describing a subroutine of zooming called within the imaging sequence described in FIG. 5.

The sequence of zooming will be described in conjunction with the flowchart of FIG. 7.

As mentioned above, the sequence of zooming is entered in response to an instruction signal sent from the zoom up SW 9 and zoom down SW 10. It is then judged at step S21 whether the output signal of the zoom switch, that is, the zoom up SW 9 or zoom down SW 10 represents an on or off state. If either of the switches is on, control is passed to step S22. If both of them are off, control is passed to step $S_{30}$.

At step S22, a zoom mode is entered. At step S23, driving the zoom motor 26 using pulses is started. At the next step S24, the number of output driving pulses P is added or subtracted, and counted up or down. The P value is then stored.

Thereafter, at step S25, data of the position of zooming is calculated based on the number of driving pulses P stored at the step S24. The data of the position of zooming is data indicating at which position within a movable range (range from the position of collapse to the wide-angle end position and from the wide-angle end position to the telephoto end position) the zoom lens barrel 1 lies. The data of the position of zooming is equivalent to the angle of rotation of the zoom cam frame 27.

At step S26, a mode of judging whether the position of zooming is normal is entered. At the next step S27, the number of driving pulses P is compared with the number of pulses dependent on the data of the predefined position of zooming pre-stored in the system controller 8.

Fundamentally, unless the stepping motor malfunctions, the number of driving pulses applied to the zoom motor 26 indicates the actual position of zooming.

At the step S27, it is judged from the outputs of the PR(A) 31 and PR(B) 32 whether the number of driving pulses P applied to the zoom motor 26 agrees with the number of pulses indicating the predefined position of zooming.

The judgment is performed only when the output signal of the PR(A) 31 or PR(B) 32 changes from the on state to the off state (positions of zooming C1, C2, C3, and C4 in FIG. 4A and FIG. 4B).

The outputs of the PR(A) 31 and PR(B) 32 are always monitored by the system controller 8. When the position of zooming becomes equivalent to any of the positions C1, C2, C3, and C4 in FIG. 4A and FIG. 4B, the number of driving pulses P that has been applied to the zoom motor 26 up to that time instant is compared with the number of driving pulses indicating the position of zooming equivalent to any of the positions C1, C2, C3, and C4.

When the number of driving pulses P agrees with the number of pulses indicating the predefined position of zooming, it is judged that the state of the zoom cam frame is normal. Control is passed to step S29. By contrast, when the number of driving pulses P disagrees with the number of pulses indicating the predefined position of zooming, the zoom cam frame 27 is thought to be moved due to, for example, the operation of an extraneous force or the like while being driven for zooming. The state of the zoom cam frame is judged not to be normal. Control is then passed to step S28.

At step S28, the data of the position of zooming stored in the system controller 8 is corrected into data of the position of zooming detected by the PR(A) 31 and PR(B) 32. Thereafter, control is passed to step S29.

At step S29, it is judged whether when the zoom motor 26 is driven by the number of times equal to or larger than a predetermined number of pulses, the PR(A) 31 and PR(B) 32 provides predetermined outputs. If it is judged that the PR(A) 31 and PR(B) 32 have provided predetermined outputs, control is returned to the step S21.

By contrast, if the outputs of the PR(A) 31 and PR(B) 32 are not the predetermined outputs, it is judged that any extraneous force keeps operating on the first group-of-lenses frame 21. Control is then passed to step S31. At the step S31, the subroutine of abnormality handling is called.

If it is judged at step S21 that both the zoom switches are off, control is passed to step S30 as mentioned above. In this case, at the step S30, if the position of zooming has not changed from that detected previously, the sequence of zooming is terminated (control is returned).

By contrast, if it is judged at the step S30 that the position of zooming has changed from the previously detected one, the first group-of-lenses frame 21 is thought to be moved due to the operation of any extraneous force or the like. Control is therefore passed to step S31, and the subroutine of abnormality handling is called.

Figure 8:
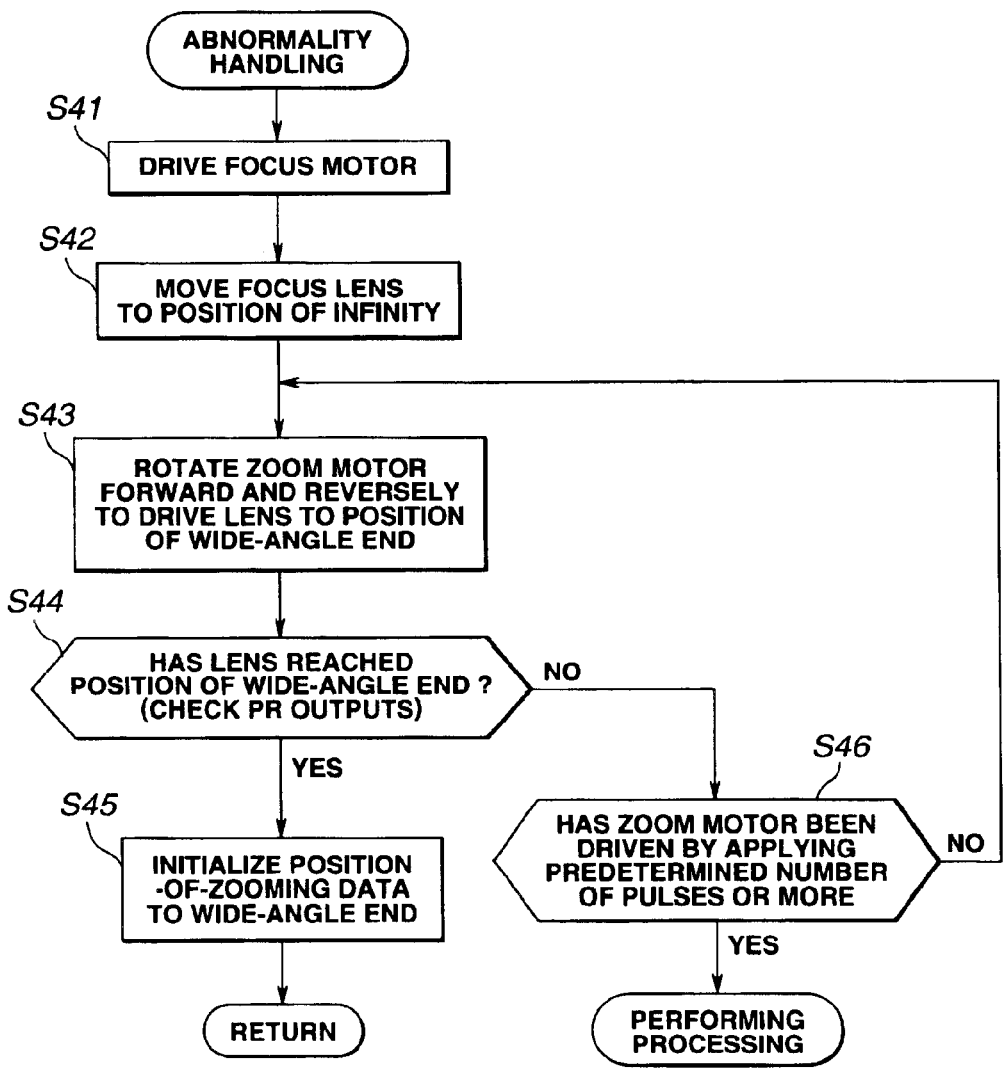
FIG. 8 is a flowchart describing a subroutine of abnormality handling called within the imaging sequence described in FIG. 5 or zooming described in FIG. 7.
Figure 9:
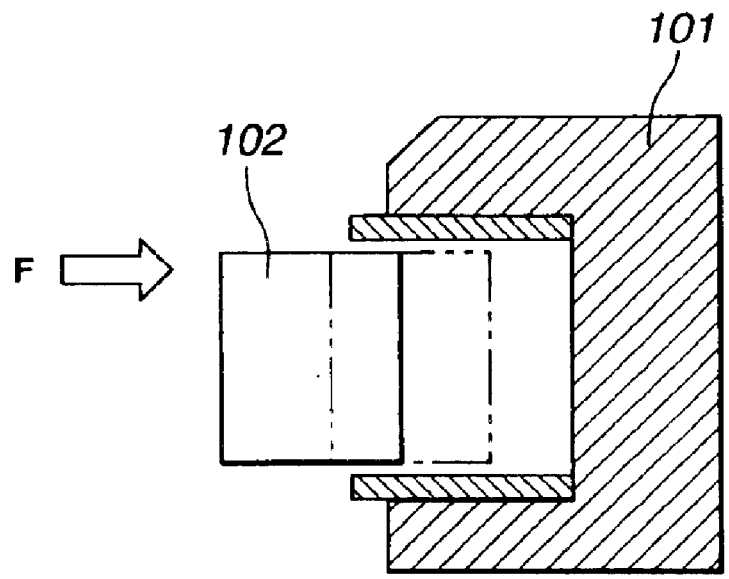
FIG. 9 is an illustrative diagram showing a state in which an extraneous force acts on a front lens frame during imaging performed by a conventional camera.

The details of the subroutine of abnormality handling will be mentioned in conjunction with the flowchart of FIG. 8.

At step S41, the focus motor 29 is driven. At the next step S42, the fourth group of lenses (focus lenses) 25 is moved to a predetermined "infinity" position. This movement is intended to prevent the third group of lenses 24 and fourth group of lenses 25 from interfering with each other because the zoom lens may presumably not lie at a correct position of thrust.

Thereafter, at step S43, the zoom motor 26 is rotated forward or reversely in order to move the zoom cam frame 27 to a predetermined position of zooming, that is, a predetermined position near the wide-angle end. If the zoom cam frame 27 has been in the collapse interval before the zoom motor 26 is driven at the step S43, the zoom motor 26 is rotated forward. This causes the zoom cam frame 27 to rotate in a predetermined direction and thrust to the wide-angle end position. Moreover, if the zoom cam frame 27 has been in the zoom interval before the zoom motor 26 is driven, the zoom motor 26 is rotated reversely. This causes the zoom cam frame 27 to rotate in a predetermined direction and plunge into the wide-angle end position.

Thereafter, at step S44, the output signals of the PR(A) 31 and PR(B) 32 are checked to see whether the zoom cam frame 27 has reached the wide-angle end position. If it is judged that the zoom cam frame 27 has reached the wide-angle end position, control is passed to the next step S45. If it is judged that the zoom cam frame 27 has not reached the wide-angle end position, control is passed to step S46.

At step S46, it is checked whether the zoom motor 26 has been driven by the number of times equal to or larger than the predetermined number of pulses. If it is confirmed that the zoom motor 26 has been driven by the number of times equal to or larger than the predetermined number of pulses, it is judged that a zooming action cannot be achieved normally for some reason. Predetermined NG processing is carried out. The NG processing is a sequence of, for example, suspending an imaging action by indicating an alarm or the like.

On the other hand, if it is judged at step S46 that the zoom motor 26 has not been driven by the number of times corresponding to the predetermined number of pulses, control is returned to the processing of step S43. The subsequent processing is repeated.

At step S45, initialization is carried out for storing the data of the position of zooming as data associated with the wide-angle end position. Consequently, the sequence of abnormality handling is completed, and control is returned to the sequence of zooming, that is, the processing of step S21 in FIG. 7.

Moreover, imaging at step S19 in FIG. 5 is processing to be executed by manipulating the release SW 11. For example, the processing is a subroutine to be carried out as part of an imaging action composed of an AE action and AF action to be executed responsively to a first release manipulation and a release action to be executed responsively to a second release manipulation. When the sequence of the imaging action is completed, the imaging is terminated. The camera is returned to the imaging standby state (control is returned to the main routine).

Figure 6:
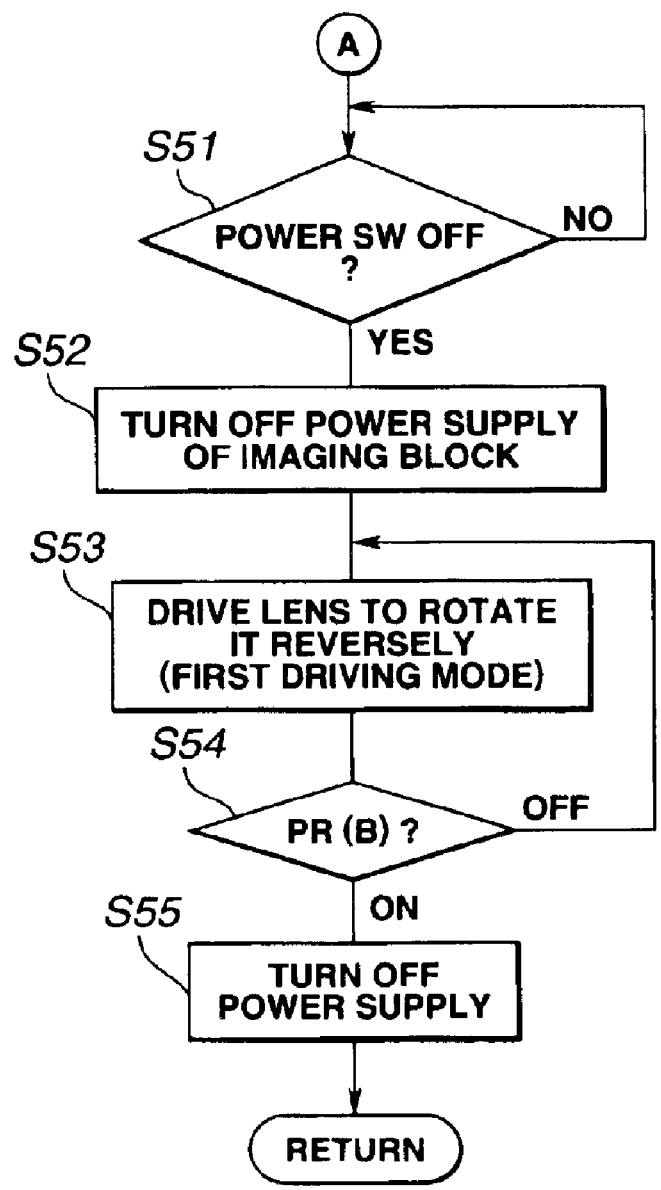
FIG. 6 is a flowchart describing a sequence of imaging termination executed in the camera shown in FIG. 1.

On the other hand, at step S20 in FIG. 5, imaging termination (power off processing) is carried out. The imaging termination is processing of terminating a state of imaging responsively to a manipulation performed on the power SW 12, and stowing the lens barrel 1 in the camera body. The sequence of imaging termination will be described in conjunction with the flowchart of FIG. 6.

In the camera of the present embodiment, when an imaging action is enabled, the system controller 8 monitors the output signal of the power SW 12 all the time. It is then judged as described at step S51 in FIG. 6 whether the output signal of the power SW 12 is a power off signal. If the off signal output from the power SW 12 is detected, imaging termination is executed.

The system controller 8 controls the power circuit 41 to stop power supply to the imaging block (turns off the power supply) at step S52. At the next step S53, the system controller 8 rotates the zoom motor 26 in a predetermined direction (herein in a reverse direction) using the zoom motor drive circuit 5 so as to rotate the zoom cam frame 27. Consequently, the plurality of lens frames including the first group-of-lenses frame 21 is plunged in a direction along the optical axis O. This causes the zoom lens barrel 1 to move in a direction of stowage. At this time, the zoom motor 26 is driven and controlled according to the two-phase excitation driving method associated with the first driving mode by the system controller 8. When the zoom lens barrel 1 moves to the position of collapse, the output signal of the PR(B) 32 is brought to an on state.

The system controller 8 monitors the output signal of the PR(B) 32. It is judged at step S54 whether the output signal of the PR(B) 32 is an on signal. As mentioned above, when the zoom lens barrel 1 reaches the position of collapse, if the PR(B) 32 generates the on signal, the system controller 8 controls the power circuit 41 to stop power supply to the zoom motor drive circuit 5 (power off processing) at step S55. The sequence of imaging termination is then terminated (end).

As mentioned above, imaging termination is executed in response to a power off signal generated when the power SW 12 is manipulated. In the imaging termination, the zoom lens barrel 1 moves from any position within the zoom interval to the position of collapse by way of part of the zoom interval and the collapse interval. At this time, the zoom motor 26 is driven and controlled in the first driving mode (two-phase excitation driving method).

In other words, when the camera can execute an imaging action, if a photographer turns off the power SW 12 arbitrarily, imaging termination is started. Immediately before the power SW 12 is manipulated, the zoom lens barrel 1 lies at any position within the zoom interval.

However, when imaging termination is carried out, it is necessary to stow the zoom lens barrel 1 as quickly as possible. According to the present embodiment, therefore, when the zoom lens barrel 1 moves over the zoom interval from any position within the zoom interval to the wide-angle end position (ready-to-image position), the zoom motor 26 is driven and controlled in the first driving mode (two-phase excitation driving method).

As described so far, according to the embodiment, when zooming is carried out as part of an imaging action, the zoom lens barrel 1 is driven and controlled in the second driving mode (single/two-phase excitation driving or micro-step driving method). Thus, higher positioning precision can be ensured while power consumption is suppressed.

Moreover, when imaging termination is started in response to a power off signal generated by the power SW 12, even if the zoom lens barrel 1 is moved over the zoom interval, the zoom lens barrel 1 is driven and controlled in the first driving mode (two-phase excitation driving method). Consequently, the zoom lens barrel 1 can be driven with a higher torque than it can in the first driving mode. Even if an unexpected extraneous force is applied to the moving zoom lens barrel 1, the lens barrel 1 can be stowed reliably. When imaging termination is carried out, power supply to the imaging block is stopped in response to a power off signal. Power consumption can therefore be suppressed. Even when a battery voltage is exhausted, the zoom motor 26 can be driven reliably.

As mentioned above, in the electronic camera of the present embodiment, optimal driving and controlling is selected according to a movable interval over which the zoom lens barrel 1 is movable. The zoom motor 26 is thus driven efficiently. This contributes to reduction in power consumption of the whole camera.

Furthermore, according to the present embodiment, a zooming encoder is unused despite the configuration in which a stepping motor is used as a driving motor for zooming. Two PRS for detecting the position of zooming are merely formed on the circumference of the zoom cam frame 27. Nevertheless, even if the position of a lens frame becomes abnormal, the position can be corrected readily. Moreover, the camera itself can be designed compactly at a low cost. For example, the first group-of-lenses frame 21 may be displaced largely due to the operation of an extraneously force or the like, or the zoom motor 26 may malfunction terribly. Even in this case, the zoom cam frame 27 is merely moved to the wide-angle end position serving as a reference, whereby the abnormal state can be corrected.

In the electronic camera, the contrast focusing method is adopted as a focusing method. A focusing action is executed for detecting information of a high-frequency component of an image signal representing an object image immediately prior to execution of an exposing action. As long as the displacement of a lens frame is limited, any particular trouble will no occur. Moreover, as long as the displacement of the lens frame is limited, controlling flashing of a strobe will not be troubled in particular.

A voltage to be applied to the zoom motor drive circuit 5 during execution of imaging termination may be higher in the first driving mode than in the second driving mode. In other words, the zoom motor 26 may be driven and controlled with a higher driving voltage in the first driving mode than in the second driving mode. Consequently, a stowing action can be achieved more quickly and reliably.

The embodiment has been described by taking an electronic camera for instance. The present invention is not limited to the electronic camera. The present invention can be implemented readily in, for example, a camera using a silver film, a video camera for recording an electronic motion picture signal on a recording medium such as a magnetic tape, or the like.

In the aforesaid embodiment, the zoom lens barrel 1 having a zooming optical system is taken for instance. The zooming optical system includes the first group of lenses 22 that is driven to advance or withdrawn from the wide-angle end position to the telephoto end position. The present invention is not limited to this type of zoom lens barrel. The present invention can be implemented in a zoom lens barrel in which, for example, a first group of lenses will not advance or withdraw between the wide-angle end and the telephoto end.

Specifically, when the zoom lens barrel is structured so that the first group of lenses will not advance or withdraw between the wide-angle end and the telephoto end, a cam groove used to drive the first group-of-lenses frame is formed in a zoom cam frame so that the cam groove will be orthogonal to the optical axis of lenses between the wide-angle end and telephoto end. Even if an extraneous force operates on the first group-of-lenses frame from the side of an object, the first group-of-lenses frame itself will not move along the optical axis owing to the pressure angle of the cam groove.

However, when an extraneous force operates, if a stepping motor is engaged in driving for zooming, resistance increases due to friction occurring between the cam groove formed in the zoom cam frame and a cam pin engaged with the cam groove. For this reason, the zoom cam frame is not rotated smoothly. Eventually, the stepping motor may malfunction. Because of the malfunction of the stepping motor, the zoom cam frame may be largely displaced from a position of zooming instructed by a system controller. This causes the positions of zooming of a second group of lenses and third group of lenses or an auxiliary frame to deviate.

If the deviation occurs, a means is included for detecting the deviation of the position of zooming in the same manner as that in the aforesaid embodiment. Occurrence of abnormality deriving from an extraneous force is recognized using the means. The zoom cam frame is temporarily moved to lie at a position of zooming equivalent to the wide-angle end position. The position of the zoom cam frame is thus corrected, and then subsequent imaging is carried out. In this case, even when a zoom lens barrel is structured so that a first group of lenses will not advance or withdrawn between the wide-angle end and telephoto end, a failure deriving from the displacement of the first group-of-lenses frame can be readily overcome.

In recent years, various types of electronic cameras capable of treating a motion picture have been proposed and put to practical use.

Even the electronic camera of the aforesaid embodiment may be readily configured so that it can produce and record motion picture data. Normally, when motion picture data is recorded, voice data is recorded simultaneously. During execution of a motion picture data recording action, that is, a motion picture imaging action, noise components must be deterred as greatly as possible. The noise components include a noise component causing the image quality of a produce motion picture to deteriorate and a noise sound mixed in voice data that is recorded together with motion picture data. As far as the electronic camera is concerned, the noise components are attributable to vibrations or a drive sound generated by a driving motor.

For configuring the electronic camera of the aforesaid embodiment so that it can produce and record motion picture data, driving and controlling the zoom motor 26 must be achieved as mentioned below.

As mentioned above, when a motion picture imaging action is executed, driving for zooming is performed. At this time, if a drive sound generated by a zoom motor is too loud, it is recorded as a noise. When a still picture imaging action is executed, even if the zoom motor generates a low-pitch drive sound during driving for zooming, imaging itself will not be affected at all.

When the still picture imaging action is executed, the zoom motor is driven and controlled according to, for example, the two-phase excitation method (first driving mode). For executing the motion picture imaging action, the zoom motor is driven and controlled using a lower current than that in the first driving mode, for example, the zoom motor is driven and controlled according to the single/two-phase excitation or micro-step driving method (second driving mode).

Owing to the driving and controlling, a low-pitch noise and little vibrations can be realized during execution of the motion picture imaging action. Deterioration of the image quality of acquired motion picture data because of noise components including a noise sound contained in voice data being recorded simultaneously with the motion picture data is prevented. Moreover, for executing the still picture imaging action, driving for zooming can be achieved more reliably and quickly. Consequently, excellent maneuverability can be ensured.

By the way, for example, when the still picture imaging action is executed, the zoom motor may be driven and controlled according to, for example, the single/two-phase excitation method (first driving mode). In this case, for executing the motion picture imaging action, the zoom motor should be driven and controlled using a lower current than that in the first driving mode, that is, the zoom motor should be driven and controlled according to the micro-step driving method (second driving mode).

Consequently, a lower-pitch noise sound and fewer vibrations can be realized.

According to the present invention, it is apparent that a wide range of different embodiments can be constructed based on the invention without a departure from the spirit and scope of the invention. This invention will be limited by the appended claims but not restricted by any specific embodiment.

What is claimed is:

1. A lens unit, comprising:

a plurality of lens frames for holding an imaging optical system, said plurality of lens frames lying in a lens barrel and moving over a stowage interval between a position of stowage at which said lens frames are stowed and a ready-to-image position at which imaging is enabled, and over a zoom interval over which the ready-to-image position exists and a power varying action is executed;

a stepping motor for moving said plurality of lens frames; and a driving control means for driving and controlling said stepping motor in a first driving mode during execution of a thrusting action for moving said plurality of lens frames from said position of stowage to said ready-to-image position or execution of a stowing action for moving said lens frames from any position within said zoom interval to said position of stowage, and for driving and controlling said stepping motor in a second driving mode, in which a lower current is used than in the first driving mode, during execution of a zooming action for moving said lens frames over said zoom interval, wherein said driving control means drives and controls said stepping motor according to a two-phase excitation method in said first driving mode and according to a single/two-phase excitation or micro-step driving method in said second driving mode, and wherein said driving control means drives and controls said stepping motor according to said two-phase excitation method when the power supply is turned off.

2. An electronic camera having an electronic imaging means for photoelectrically converting an object image formed by an imaging optical system and thus producing an image signal, an image processing means for performing predetermined processing on the image signal produced by said electronic imaging means and thus converting the image signal into a predetermined form, and a recording means for recording an output of said image processing means as image data, said electronic camera comprising:

a plurality of lens frames for holding said imaging optical system, said plurality of lens frames lying in a lens barrel and moving over a stowage interval between a position of stowage at which said lens frames are stowed and a ready-to-image position at which imaging is enabled, and over a zoom interval over which said ready-to-image position exists and a power varying action is executed;

a stepping motor for moving said plurality of lens frames;

a conveying means for conveying a driving force produced by said stepping motor to said lens frames; and a driving control means for driving mode during execution of a thrusting action for moving said plurality of lens frames from said position of stowage to said ready-to-image position or execution of a stowing action for moving said lens frames from any position within said zoom interval to said position of stowage, and for driving and controlling said stepping motor in a second driving mode, in which a lower current is used than in said first driving mode, during execution of a zooming action for moving said lens frames over said zoom interval, wherein said driving control means drives and controls said stepping motor according to a two-phase excitation method in said first driving mode and according to a single/two-phase excitation or micro-step driving method in said second driving mode, and wherein said driving control means drives and controls said stepping motor according to said two-phase excitation method when the power supply is turned off.

* * * * *